United States Patent
Zhou et al.

(10) Patent No.: US 9,807,398 B2
(45) Date of Patent: Oct. 31, 2017

(54) MODE COMPLEXITY BASED CODING STRATEGY SELECTION

(71) Applicant: Broadcom Corporation, Irvine, CA (US)

(72) Inventors: Minhua Zhou, San Diego, CA (US); Wade Keith Wan, Orange, CA (US); Zhijie Yang, Irvine, CA (US); Peisong Chen, San Diego, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 303 days.

(21) Appl. No.: 14/547,280

(22) Filed: Nov. 19, 2014

(65) Prior Publication Data

US 2016/0094855 A1 Mar. 31, 2016

Related U.S. Application Data

(60) Provisional application No. 62/057,693, filed on Sep. 30, 2014.

(51) Int. Cl.
| | |
|---|---|
| *H04N 19/50* | (2014.01) |
| *H04N 19/176* | (2014.01) |
| *H04N 19/147* | (2014.01) |
| *H04N 19/124* | (2014.01) |
| *H04N 19/127* | (2014.01) |
| *H04N 19/19* | (2014.01) |

(52) U.S. Cl.
CPC ......... *H04N 19/176* (2014.11); *H04N 19/124* (2014.11); *H04N 19/127* (2014.11); *H04N 19/147* (2014.11); *H04N 19/19* (2014.11)

(58) Field of Classification Search
CPC .... H04N 19/176; H04N 19/147; H04N 19/19; H04N 19/127; H04N 19/124; H04N 19/11; H04N 19/96; H04N 19/513; H04N 19/107; H04N 19/593; H04N 19/567; H04N 19/56; H04N 19/137; H04N 19/129; H04N 19/159; H04N 19/436; H04N 19/119; H04N 19/50; H04N 19/184; H04N 19/149; H04N 19/48; H04N 19/109; H04N 19/18; H04N 19/14; H04N 19/122; H04N 19/154;
(Continued)

(56) References Cited

U.S. PATENT DOCUMENTS

| | | | | |
|---|---|---|---|---|
| 8,559,501 B2* | 10/2013 | Chen | ............ | H04N 19/159 375/240.01 |
| 2008/0243971 A1* | 10/2008 | Po | ............ | H04N 19/176 708/4 |

(Continued)

FOREIGN PATENT DOCUMENTS

| | | | | |
|---|---|---|---|---|
| DE | EP1727370 | * | 11/2006 | ......... H04N 19/176 |

*Primary Examiner* — Dramos I Kalapodas
(74) *Attorney, Agent, or Firm* — McDermott Will & Emery LLP

(57) ABSTRACT

A system may receive an input stream for a coding operation. The system may determine available coding modes for the coding operation. The system may include coding selection logic that may determine a coding mode in response to the based on the available selection of coding modes. The coding selection logic may use the selected coding mode to determine a coding strategy. The selection logic may send an indication of the selected coding mode and coding strategy to coding logic to support execution of the coding operation, which may use the selected coding mode and coding strategy.

20 Claims, 7 Drawing Sheets

(58) Field of Classification Search
CPC ............... H04N 19/126; H04N 19/61; H04N 19/00951; H04N 19/00096; H04N 19/00781; H04N 19/00569; H04N 19/192; H04N 19/146; H04N 19/136; H04N 19/132; H04N 2213/003
See application file for complete search history.

(56) References Cited

U.S. PATENT DOCUMENTS

| | | | |
|---|---|---|---|
| 2010/0295922 A1* | 11/2010 | Cheung | H04N 19/176 348/42 |
| 2010/0322311 A1* | 12/2010 | Vetro | H04N 19/597 375/240.12 |
| 2011/0090960 A1* | 4/2011 | Leontaris | H04N 19/103 375/240.12 |
| 2012/0170646 A1* | 7/2012 | Baylon | H04N 19/619 375/240.02 |
| 2014/0219342 A1* | 8/2014 | Yu | H04N 19/50 375/240.12 |
| 2015/0016521 A1* | 1/2015 | Peng | H04N 19/00569 375/240.12 |
| 2015/0124872 A1* | 5/2015 | Zhou | H04N 19/176 375/240.03 |
| 2015/0350682 A1* | 12/2015 | Zhang | H04N 19/122 375/240.16 |
| 2016/0127725 A1* | 5/2016 | Jamali | H04N 19/103 375/240.12 |
| 2016/0255346 A1* | 9/2016 | Sato | H04N 19/176 |

\* cited by examiner

MODE COMPLEXITY BASED CODING STRATEGY SELECTION

PRIORITY CLAIM

This application claims priority to provisional application Ser. No. 62/057,693, filed Sep. 30, 2014, which is entirely incorporated by reference.

TECHNICAL FIELD

This disclosure relates predictive video encoding. This disclosure also relates to memory and bandwidth usage during video coding.

BACKGROUND

Rapid advances in electronics and communication technologies, driven by immense customer demand, have resulted in the worldwide adoption of devices that display a wide variety of video content. Examples of such devices include smartphones, flat screen televisions, and tablet computers. Improvements in video processing techniques will continue to enhance the capabilities of these devices.

DETAILED DESCRIPTION

The disclosure below discusses techniques and architectures for selection among coding modes and coding strategies to support high efficiency coding. For example, a coding mode, such as a block size, prediction mode, codec selection, and/or other coding mode may be selected. Different coding modes may be associated with different complexity level for various coding operations and calculations. For example, the complexity may affect the efficiency and/or resource usage for cost metric calculations, such as a calculation of the rate distortion optimization cost metric. The architecture discussed below may select a coding strategy based on the coding mode. For example, a selected bit depth or use of the frequency domain for transform operations may be implemented. Selection of a coding mode and coding strategy may allow a balance between resource usage and coding quality.

Figure 1:
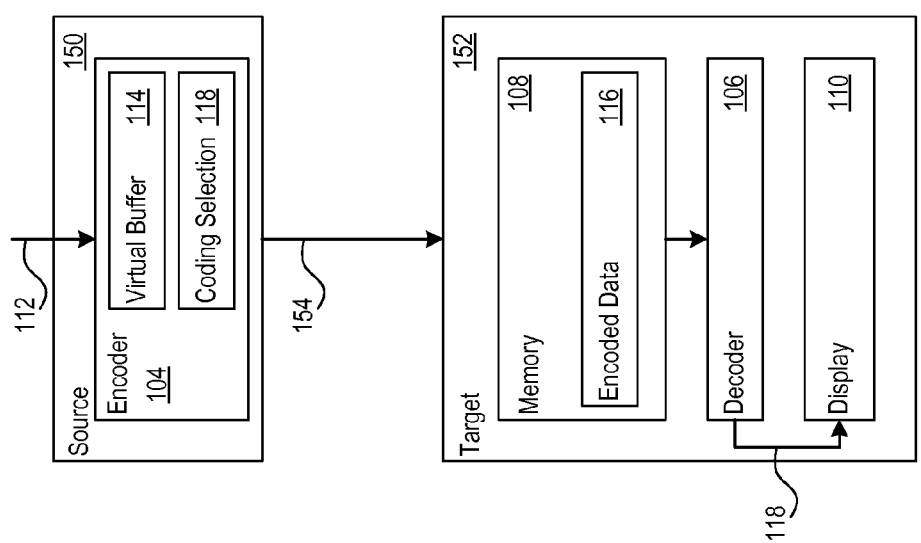
FIG. 1 shows an example architecture in which a source communicates with a target through a communication link.

FIG. 1 shows an example architecture 100 in which a source 150 communicates with a target 152 through a communication link 154. The source 150 or target 152 may be present in any device that manipulates image data, such as a DVD or Blu-ray player, streaming media device a smartphone, a tablet computer, or any other device. The source 150 may include an encoder 104 that maintains a virtual buffer 114. The target 152 may include a decoder 106, memory 108, and display 110. The encoder 104 receives source data 112 (e.g., source image data) and may maintain the virtual buffer 114 of predetermined capacity to model or simulate a physical buffer that temporarily stores compressed output data. The encoder 104 may also evaluate the encoded symbols for transmission at a predetermined bit rate. The encoder 104 may specify the bit rate, as just two examples, in units of bits per pixel, or in units of bits per unit of time. The coding selection logic 118 may determine coding modes and/or coding strategies as discussed below.

The encoder 104 may determine the bit rate, for example, by maintaining a cumulative count of the number of bits that are used for encoding minus the number of bits that are output. While the encoder 104 may use a virtual buffer 114 to model the buffering of data prior to transmission of the encoded data 116 to the memory 108, the predetermined capacity of the virtual buffer and the output bit rate do not necessarily have to be equal to the actual capacity of any buffer in the encoder or the actual output bit rate. Further, the encoder 104 may adjust a quantization step for encoding responsive to the fullness or emptiness of the virtual buffer. An exemplary encoder 104 and operation of the encoder 104 are described below.

The memory 108 may be implemented as Static Random Access Memory (SRAM), Dynamic RAM (DRAM), a solid state drive (SSD), hard disk, or other type of memory. The communication link 154 may be a wireless or wired connection, or combinations of wired and wireless connections. The encoder 104, decoder 106, memory 108, and display 110 may all be present in a single device (e.g. a smartphone). Alternatively, any subset of the encoder 104, decoder 106, memory 108, and display 110 may be present in a given device. For example, a streaming video playback device may include the decoder 106 and memory 108, and the display 110 may be a separate display in communication with the streaming video playback device.

In various implementations, different codecs may be used to perform coding operations, such as encoding, decoding, transcoding, and/or other coding operations. For example, codecs may include, the high efficiency video coding (HEVC), VP9 available from Google, Daala, audio video standard 2 (AVS2), and/or other codecs. Codecs may employ multiple modes which may be selected for differing coding conditions and resources.

Figure 2:
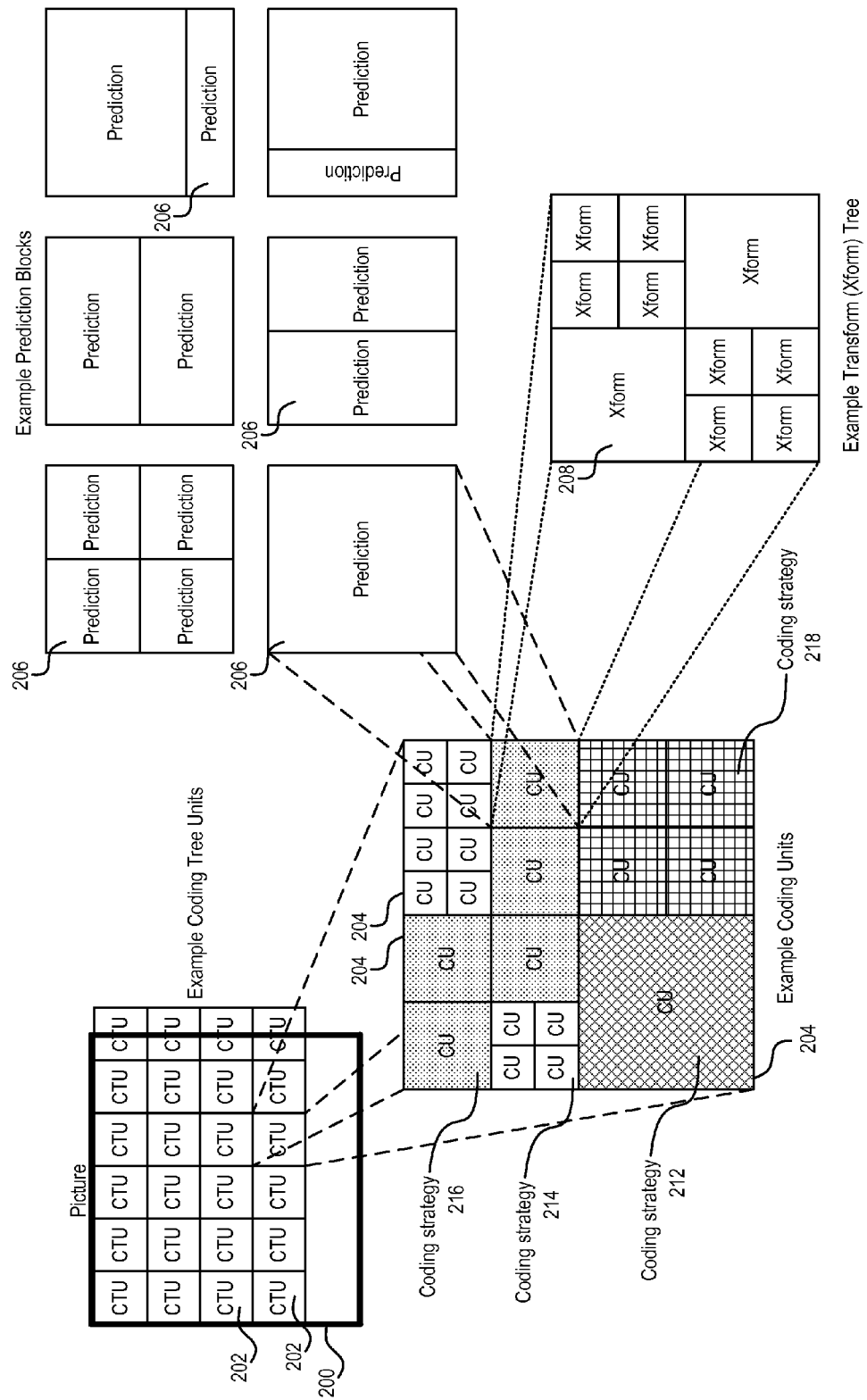
FIG. 2 shows an example block coding structure.

In various implementations, a coding mode may use a particular block coding structure. FIG. 2 shows an example block coding structure, in which different block sizes may be selected. As shown in FIG. 2, a picture 200 is divided into coding tree units (CTUs) 202 that may vary widely in size, e.g., 16×16 pixels or less to 64×64 pixels or more in size. A CTU 202 may further decompose into coding units (CUs) 204. A CU can be as large as a CTU and the smallest CU size can be as small as desired, e.g., down to 8×8 pixels. At the CU level, a CU is split into prediction units (PUs) 206. The PU size may be smaller or equal to the CU size for intra-prediction or inter-prediction. The CU 204 may be split into transform units (TUs) 208 for transformation of a residual prediction block. TUs may also vary in size. Within a CTU, some CUs can be intra-coded, while others can be inter-coded. Such a block structure offers the coding flexibility of using different PU sizes and TUs sizes based on characteristics of incoming content. In some cases, systems may use large block size coding techniques (e.g., large prediction unit size up to, for instance, 64×64, large transform and quantization size up to, for instance, 32×32) which may support efficient coding.

In some cases, increased block or CU sizes may increase operational complexity. For example, the resources, e.g., CPU, memory, bandwidth, cycles, used performing a transform on a large block may be greater than that used for a small block when other factors are held constant. The system may implement any number of different coding strategies for blocks of any particular size. FIG. 2 shows four different coding strategies 212, 214, 216, and 218 applied to different CUs.

In some implementations, the coding logic 300 and/or coding selection logic 600, discussed below with respect to FIGS. 5 and 6, may adopt a large block size or another computationally complex mode to support high efficiency coding. For example, a large block may be determined by comparison to a predetermined size threshold, e.g., a block size greater than 32×32. However, an effective use of complex mode coding, such as use of large block coding tools, may involve a series of decisions. For example, splitting a CTU into a number of intra- or inter-coded CUs, may affect the coding efficiency. Splitting a CTU into one or more CUs or other complex mode decisions may use metrics, such as SAD (Sum of Absolute Difference) and SATD (Sum of Absolute Transform Difference). However, a metric, such as a rate-distortion optimization (RDO) metric which may consume more resources during calculation, may lead to overall gains once the increased efficiency. However, in some cases, an estimated RDO calculation may meet performance criteria for complex modes. For example lower bit-depth RDO calculations may paired with larger block sizes.

Various cost metrics may be computed based on a weighted combination of factors. The factors used may vary greatly among implementations. Two example factors are listed below:

TABLE 1

Example factors.

| Factor | Description |
| --- | --- |
| Distortion | Error caused by compression a block |
| Rate | Bits used to code the block |

In some cases, factors may be correlated. For example, increasing one factor may lead to a corresponding decrease or increase in another factor (e.g., a tradeoff, complement, or other relationship). For the example factors above, coded output with less distortion may use more bits to code (e.g., a higher bit rate). In some cases, the relative importance of the rate in relation to distortion may be a function of the desired video quality. In high bit-rate and high video quality situations, the number of bits consumed may be less important than in a low-bit-rate, low-video-quality situation. In various implementations, the assigned cost for a bit may be scaled by a weight (lambda) as shown below.

$$RD\ Cost = Distortion + \lambda \cdot Rate$$

In various implementations, other factors may be assigned a weight. For example, a weight may be assigned to distortion or a measure or motion within a group of frames. Factors used and weights assigned may vary greatly among differing implementations.

Figure 3:
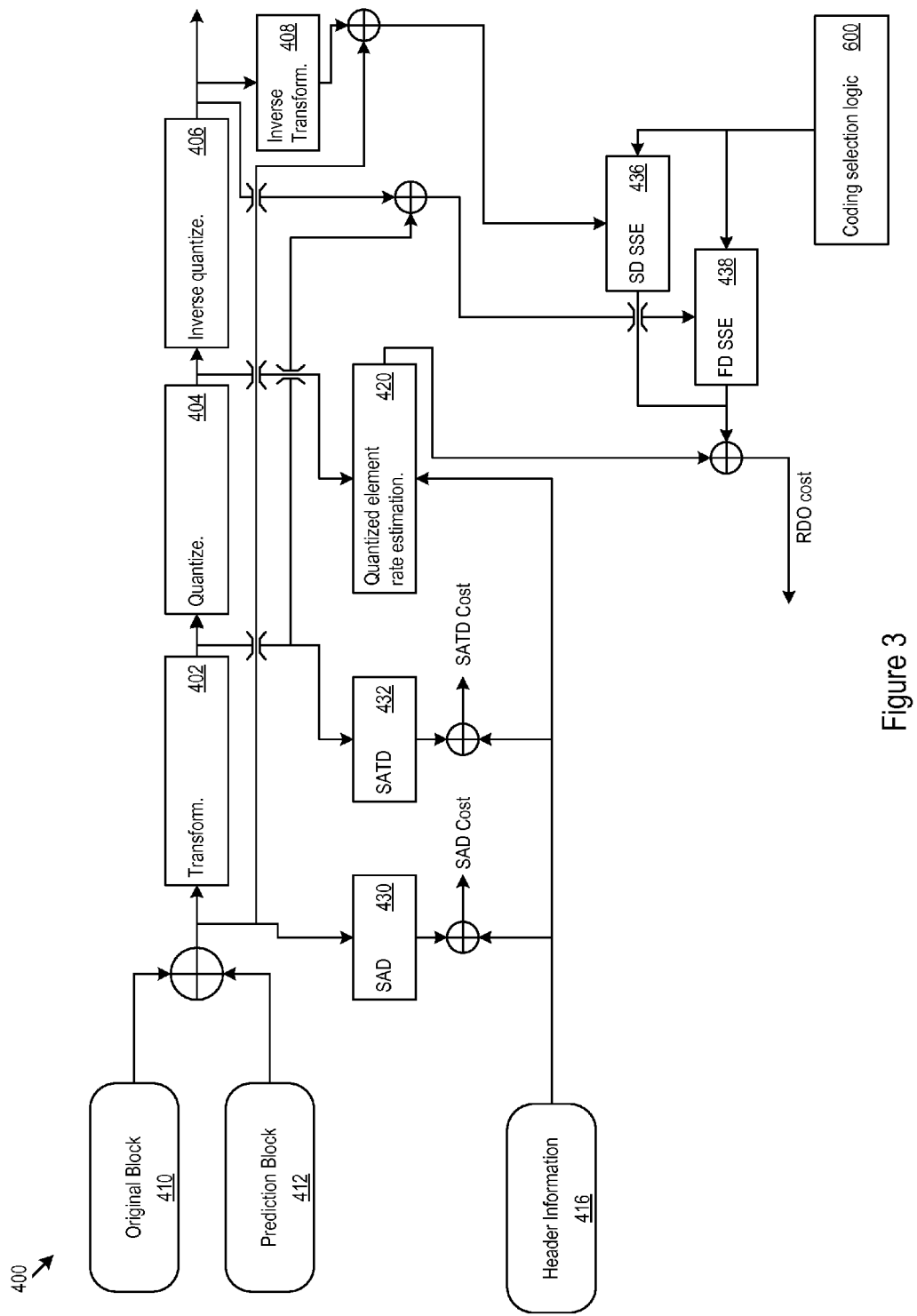
FIG. 3 shows example logic for cost metric calculation.

FIG. 3 shows example logic 400 for cost metric calculation. The example logic 400 may calculate the SAD, SATD, and/or RDO cost metrics. The example logic for calculating the three metrics allows for calculation complexity comparisons. However, in various implementations, separate logic may be implemented to determine any one or more of the cost metric calculations. The RDO cost metric may be more complex to calculate than the SAD and SATD cost metrics.

In some cases, the bit depth for the RDO calculation may be altered depending on the coding mode to control resource consumption during estimation. For example, lower bit-depths in transformation 402, quantization 404, inverse quantization 406 and inverse transformation 408 may be paired with higher complexity coding modes. In FIG. 3, the original block 410 represents the block from the input stream that is currently being processed, and the prediction block 412 represents a block (either the intra-predicted block or an inter-predicted block) on which the prediction for the current block is based. The header information 416 represents information included in the input stream to support coding operations. Transformation 402, quantization 404, inverse quantization 406 and inverse transformation 408 of the combined original block 410 and prediction block 412 inputs may be used by the circuitry 400 to calculate the distortion. For example, the distortion may include the error between the output of transformation 402 and the output of the quantization 406, or the distortion may include the error between the input to transformation 402 and the output of inverse transformation 408. The distortion is used in the RDO cost metric calculation. The SAD and SATD cost metric calculations may be formulated differently and may not include a distortion component. The SAD calculation 430 may use the SAD from the residual block being processed by the logic for the coding operation. The SATD metric may use a SATD 432 that is calculated using a transformed block. The SAD 430 and SATD 432 calculations need not necessarily use calculations dependent on quantization or inverse quantization. For rate estimation, the SAD and SATD metrics may use the rate estimation stored in the header information 416. However, the RDO metric may use additional rate estimation 420 from the quantized transform coefficients and the sum of the squared error (SSE) 436, 438. The SSE may be calculated in the frequency domain 436 (FD SSE) or in the spatial domain 438 (SD SSE). To implement a FD SSE calculation, the difference of the output of transformation 402 and the output of inverse quantization 406 is provided to the FD SSE 438 as input. To implement a SD SSE calculation, the output of the inverse quantization 406 is inversely transformed 408. The difference of the input to transformation 402 and the output of the inverse transform 408 is provided to the SD SSE 436 as input. Input from the coding selection logic 600 may be used to determine the calculation domain for the SSE 436, 438. In various implementations, the input from the coding selection logic (600) may be used to determine the complexity level at which the SSE 436, 438 is calculated. For example, the bit-depth at which the SSE 436, 438 is calculated may be reduced for large block sizes. The calculation of different cost metrics may attach different weights to different factors. For example, pre-defined and/or configurable weights may be attached to a set of factors. In various implementations, the calculated cost metric output may then be passed to the coding selection logic 600, discussed below, for coding strategy selection.

Figure 4:
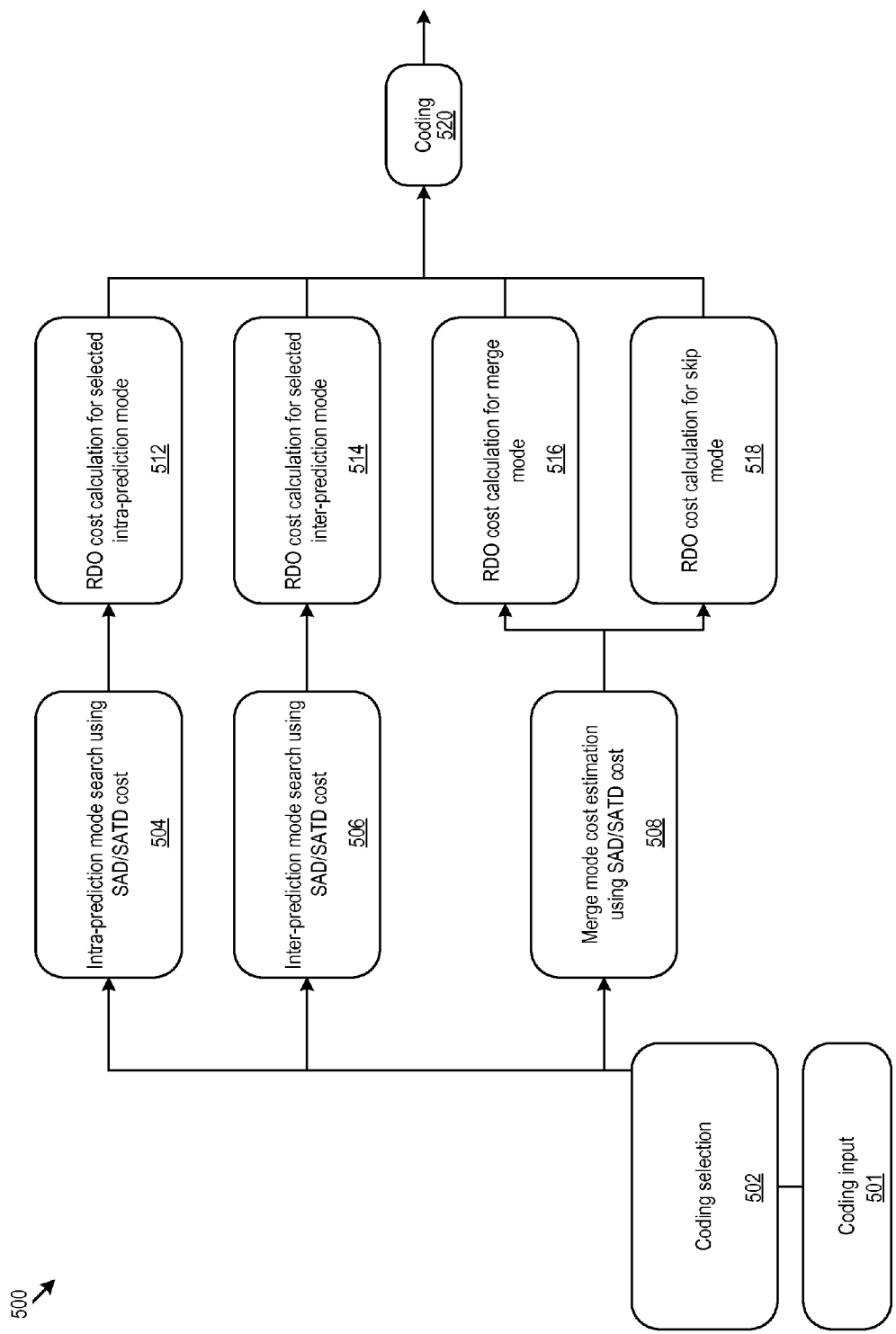
FIG. 4 shows an example rate distortion optimization based coder.

In some RDO-based implementations, the RDO calculation may be applied at individual coding stages. In some cases, the RDO calculation need not be applied for every individual coding stage. Further, based on the coding strategy selection, RDO calculations may be performed at various complexity levels. For example, for large blocks RDO may be calculated at a lower bit depth than for small blocks. FIG. 4 shows and example RDO-based coder 500. The coder may accept a coding input (501), such as a coding unit (CU). In the example coder 500, the RDO metric may be used for mode selection, block size selection, coding strategy selection, and/or other coding selection (502). SAD and/or SATD metrics may be used for intra mode searching (504), e.g. intra mode estimation, and inter-prediction motion vector search, e.g. motion estimation (506). Additionally or alternatively, the example coder 500 may use SAD and/or SATD metrics to perform merge mode cost estimation (508). In the merge mode, motion data from neighboring CUs may be inherited. After estimation, RDO cost estimation may be performed for specific intra modes (512), inter modes (514), and merge modes (516), with competitive, (e.g. best, better, and/or other relative measure) SAD and/or SATD metrics. Additionally or alternatively, a RDO cost estimate for a skip mode (518) may be calculated. In the skip mode, motion data may be inherited from neighbors and coefficients, such as luma and chroma, may be set to a predetermined setting (e.g., zero) for the CU. Based on the RDO costs, the coder may determine whether the current CU may be intra-coded or inter-coded. If the current CU is inter-coded, the coder 500 may further determine whether the current CU may select the inter-prediction mode, merge mode, or skip mode. The process can be repeated for CUs in a CTU. Coding (520) may be performed based on the coding selections.

Figure 5:
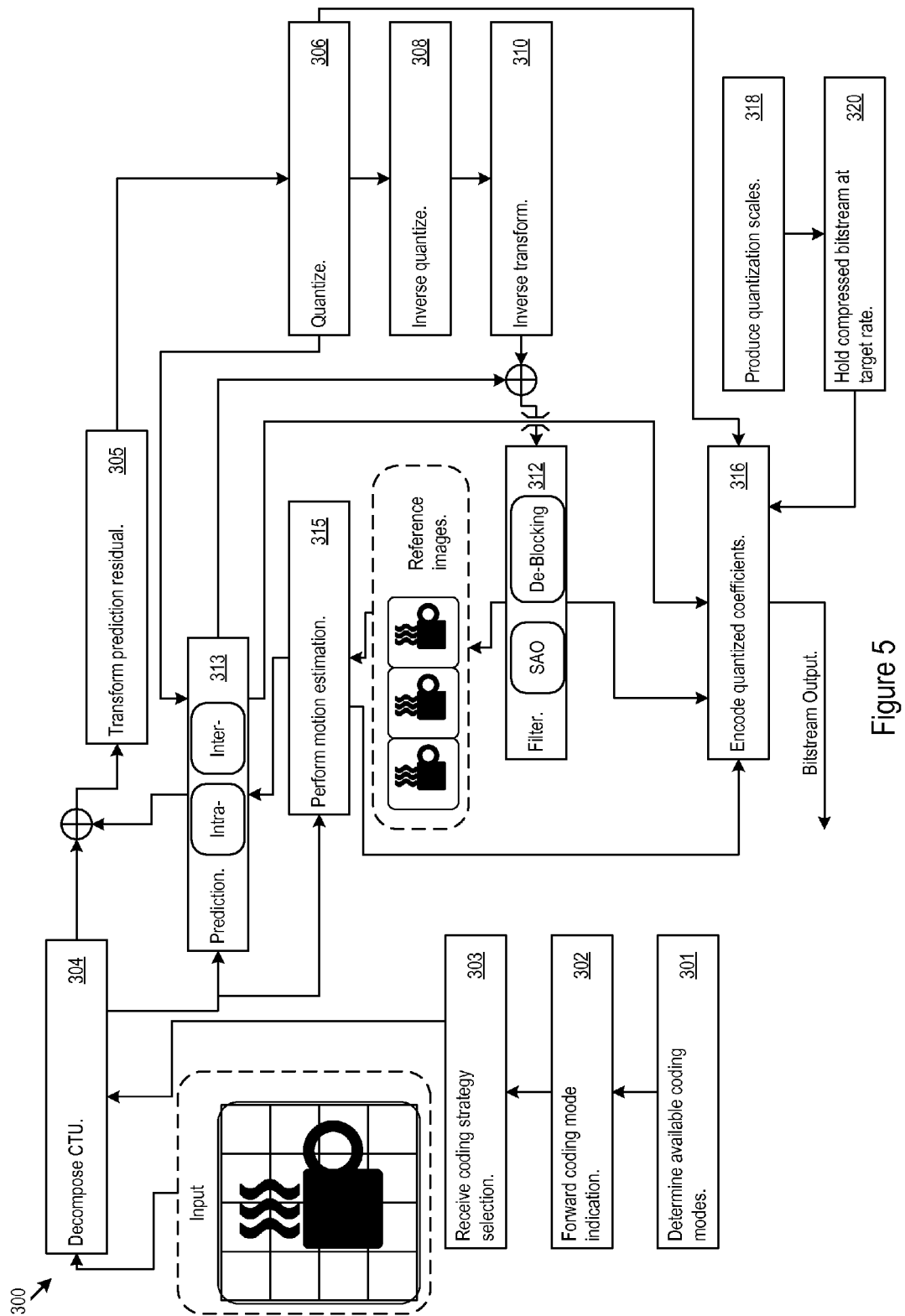
FIG. 5 show example coding logic for coding tree unit processing.

FIG. 5 shows example coding logic 300 for coding tree unit processing. As shown in FIG. 5, the coding logic 300 may decompose a CTU into CUs (304). CU motion estimation and intra-prediction are performed to allow selection of the inter-mode and/or intra-mode for the CU (313). The coding logic 300 may transform the prediction residual (305). For example, a discrete cosine transform (DCT), a discrete sine transform (DST), a wavelet transform, a Fourier transform, and/or other transform may be used to decompose the block into frequency and/or pixel component. In some cases, quantization may be used to reduce or otherwise change the number of discrete chroma and/or luma values, such as a component resulting from the transformation operation. The coding logic 300 may quantize the transform coefficients of the prediction residual (306). After transformation and quantization, the coding logic 300 may reconstruct the CU encoder via inverse quantization (308), inverse transformation (310), and filtering (312). In-loop filtering may include de-blocking filtering, Sample Adaptive Offset (SAO) filtering, and/or other filtering operations. The coding logic 300 may store the reconstructed CU in the reference picture buffer. The picture buffer may be allocated on off-chip memory to support large picture buffers. However, on-chip picture buffers may be used. At the CTU level, the coding logic 300 may encode the quantized transform coefficients along with the side information for the CTU (316), such as prediction modes data (313), motion data (315) and SAO filter coefficients, into the bitstream using a coding scheme such as, Context Adaptive Binary Arithmetic Coding (CABAC). The coding logic 300 may include rate control, which is responsible for producing quantization scales for the CTUs (318) and holding the compressed bitstream at the target rate (320).

In various implementations, the coding logic 300 may determine a coding mode or available coding modes for the operations (301). In some implementations, the coding logic 300 may forward the coding mode selection and/or available coding modes to the coding selection logic 600 as discussed below (302). The coding logic 300 may receive a response indicating a coding mode and/or coding strategy from the coding selection logic 600 (303).

Figure 6:
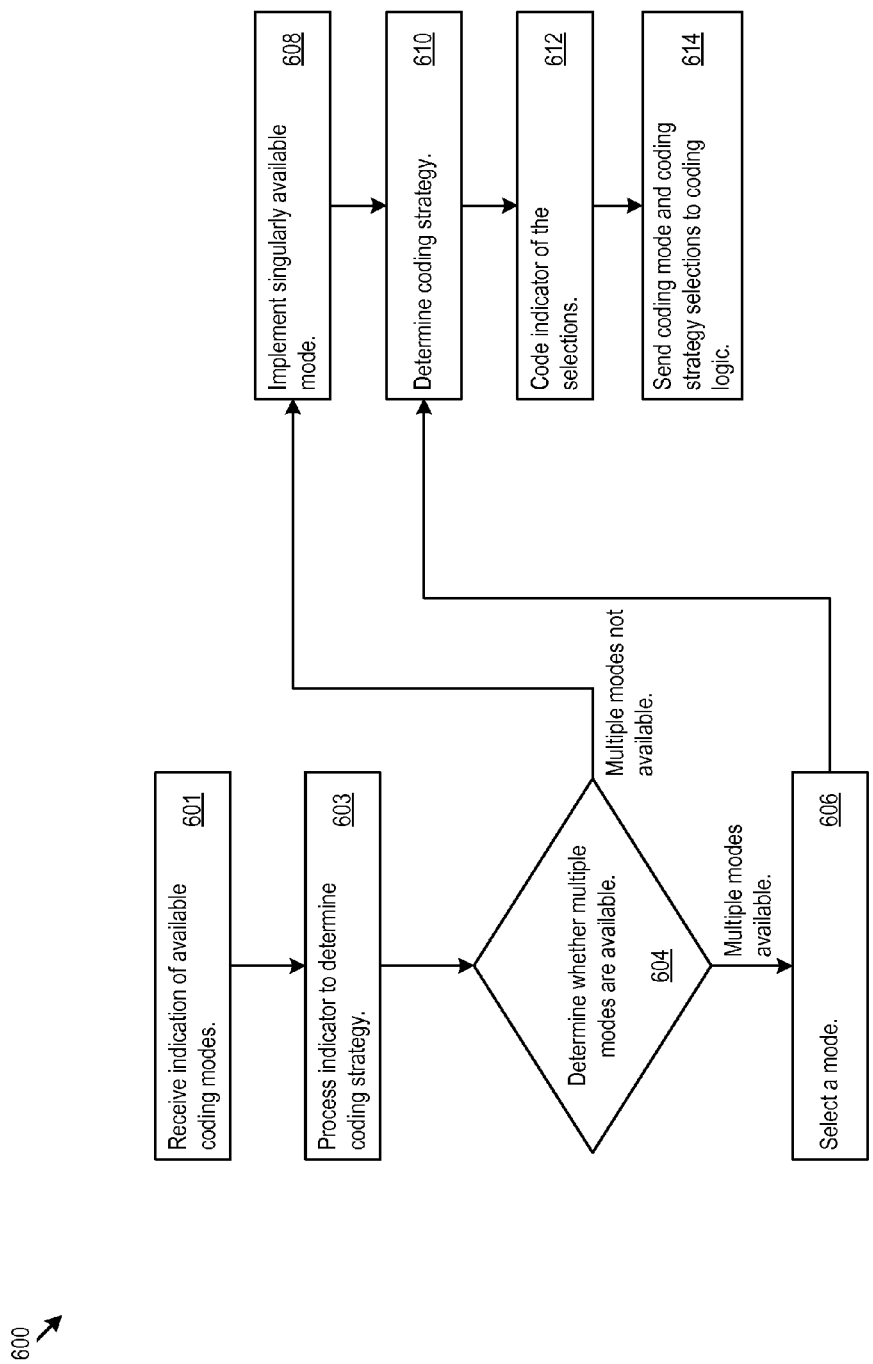
FIG. 6 shows example coding selection logic for coding strategy selection.

FIG. 6 shows example coding selection logic 600 for coding strategy selection. The logic may receive an indication of one or more available coding modes (601). The logic may process the indicator to determine a coding strategy for the calculation of coding values and execution of coding modes (603).

In some implementations, the determined coding strategy may indicate a location along a pre-calculated cost metric curve to simplify cost metric calculation. For example, the coding selection logic 600 may store a pre-calculated RDO cost curve. Additionally or alternatively, the coding selection logic 600 may calculate the RDO cost curve. The coding selection logic 600 may use mode parameters, e.g. block size and/or other parameters, as inputs to determine a position along the curve.

The coding selection logic 600 may determine whether there are multiple modes to select among (604). For example, the may determine among available block or CU sizes, color modes, prediction modes, and/or other parameters. When there are multiple available modes present, the coding selection logic 600 may select a mode (606). The mode decision may be determined based on available resources, stored parameters, comparative mode complexity (e.g., RDO cost and/or other metrics), input for external applications and/or other inputs. When multiple modes are not available, the coding selection logic 600 may implement the one available mode (608).

The coding selection logic 600 may then determine a coding strategy based on the selected and/or singular coding mode (610). For example, the logic may select a bit depth for one or more operations or calculations. For example, a block may be assigned a bit depth based on its size. RDO calculations and/or other operations may be performed using the assigned bit depth. For example, 8-bit RDO calculations may be used for 4×4 blocks, 7-bit for 8×8, and 6-bit for 16×16, 5-bit for 32×32, and/or 4-bit for 64×64. However, the assigned bit depths may vary widely among and within implementations.

Additionally or alternatively, blocks may be assigned bit depths based on an estimated difficulty of transforming the block. For example, a number of the transform size of the block may indicate transform complexity. In some implementations, blocks associated with larger transform complexity may be assigned lower bit depths, e.g., for cost estimation and/or other calculations, than blocks with smaller transform complexity. In some implementations, the coding strategy may include a selection of the calculation domain. For example, the SSE, which may be used in cost metric calculations, may be calculated in the in the frequency domain instead of the spatial domain. In an example, a higher degree of accuracy may be obtained using a spatial domain calculation instead of a frequency domain calculation. However, in the same example, the frequency domain calculation may be more efficient. Thus, in some cases, a higher accuracy spatial domain calculation may be desirable for less complex operations, and a lower accuracy higher efficiency frequency domain calculation may be desirable for more complex operations.

In various implementations, a coding strategy, e.g. bit depth selection and/or calculation domain selection, may be used to manage a number of parameters. For example, coding strategy selection may depend on operational complexity, resource availability, codec selection, network performance, and/or other factors.

In some implementations, once a coding strategy has been selected, the coding selection logic 600 may code an indicator of the mode and strategy selections (612). For example, the coding selection logic 600 may cause placement, e.g. by the coding logic 300, of an indicator of the coding mode within metadata for the coded stream. Additionally or alternatively, an indication of the coding strategy may be coded into the bitstream. The coding selection logic 600 may send the coding mode and/or coding strategy selections to the coding logic 300 for execution (614).

Figure 7:
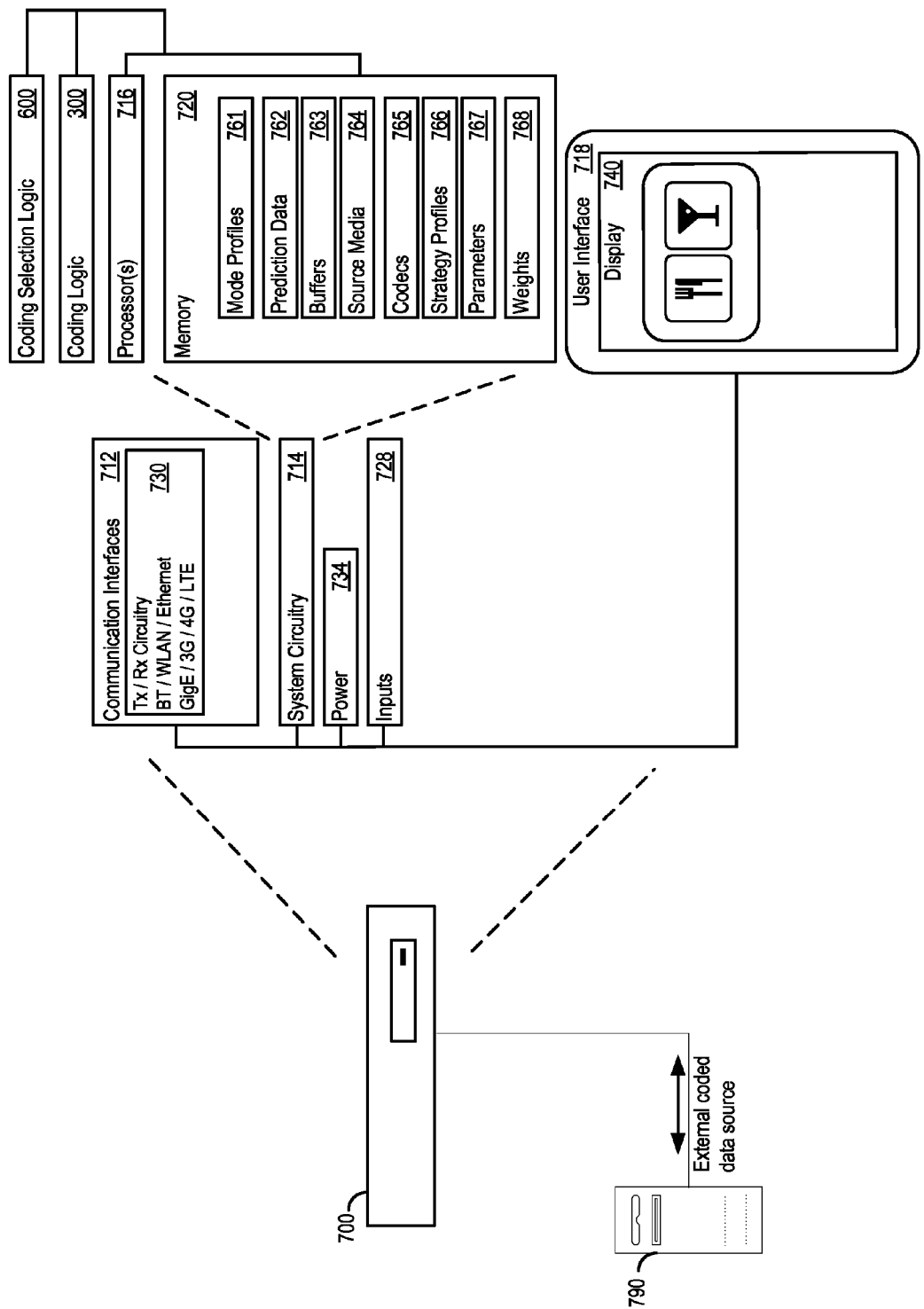
FIG. 7 shows an example coding device.

FIG. 7 shows an example coding device 700. The coding device 700 may include system circuitry 714 to support execution of the coding described above. The system circuitry may include processors 716 (e.g. graphics processing units, general purpose processors, audio processors, and/or other processing devices), memory 720, and/or other circuitry. In various implementations, the coding selection logic 600 and coding logic 300 may be implemented on the processors 716 and/or the memory 720.

The memory 720 may be used to store the data and/or media for coding operations. For example, the memory made store mode profiles 761, prediction data 762, buffers 763, source media 764, codecs 765, coding strategy profiles 766, cost metric parameters 767 and weights 768, and/or other data to support the coding logic 300 and/or coding selection logic 600, described above.

The execution device 700 may also include communication interfaces 712, which may support wireless, e.g. Bluetooth, Wi-Fi, WLAN, cellular (4G, LTE/A), and/or wired, ethernet, Gigabit ethernet, optical networking protocols. The communication interface may support communication with external coded data sources 790. For example, the coded data sources may include streaming video servers, headends, and/or other network coded data sources. The coding device 700 may include power functions 734 and various input interfaces 728. The execution device may also include a user interface 718 that may include human interface devices and/or graphical user interfaces (GUI). The user interface may include a display 740 to present video, images, and/or other visual information and/or to the operator. In various implementations, the GUI may support portable access, such as, via a web-based GUI. The coded data, e.g. bitstream, from the coding logic 300 may be passed to the display for viewing by the operator. In various implementations, the system circuitry 714 may be distributed over multiple physical servers and/or be implemented as one or more virtual machines.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method performed at a coding device, the method comprising:
   determining, at a selection circuitry, a coding mode from among available coding modes for performing a coding task on a coding input, the coding mode indicating a block size for the coding task;
   responsive to determining the coding mode, determining a coding strategy, wherein the coding strategy indicates a bit depth to be used for a cost metric calculation, the bit depth selected based at least in part on the block size;
   sending an indication of the coding mode and the coding strategy to a coding circuitry;
   initiating the cost metric calculation, at the coding circuitry, using the block size indicated by the coding mode and using the bit depth indicated by the coding strategy; and
   performing, by the coding circuitry, the coding task using the coding mode and the coding strategy based at least in part on the cost metric calculation.

2. The method of claim 1, wherein determining the coding mode comprises determining the block size for the coding task.

3. The method of claim 1, wherein determining the coding mode comprises determining a codec for the coding task.

4. The method of claim 1, wherein initiating the cost metric calculation comprises determining a rate-distortion optimization cost function.

5. The method of claim 1, wherein determining the coding strategy comprises selecting the bit depth based at least in part on the block size.

6. The method of claim 5, wherein selecting the bit depth comprises selecting a higher bit depth for the coding mode than for a second coding mode, the second coding mode having a greater complexity than the coding mode.

7. The method of claim 1, wherein the coding strategy is further determined responsive to available resources for coding.

8. The method of claim 1, wherein the coding strategy comprises a selection of a calculation domain for a transformation used in the coding task.

9. The method of claim 8, wherein the calculation domain comprises a frequency domain or a spatial domain.

10. The method of claim 1, wherein the coding task comprises decoding, encoding, transcoding, or any combination thereof.

11. A coding device comprising:
an input interface configured to receive an input stream;
a coding circuitry in data communication with the input interface and configured to perform a cost metric calculation on a portion of the input stream and to perform a coding task on the input stream; and
a selection circuitry, in data communication with the coding circuitry, the selection circuitry configured to:
determine a coding mode for the input stream, the coding mode indicating a block size for a block used in the coding task;
responsive to the determined coding mode, select a bit depth for the block based at least in part on the block size indicated by the coding mode; and
send an indication of the bit depth and the coding mode to coding circuitry to perform the cost metric calculation based at least in part on the block size and the bit depth in support of execution of the coding task based on the coding mode.

12. The coding device of claim 11, wherein the selection circuitry is configured to determine the block size indicated by the coding mode.

13. The coding device of claim 11, wherein the selection circuitry is configured to determine a codec for the coding task to determine the coding mode.

14. The coding device of claim 11, wherein the selection circuitry is configured to determine the bit depth for the cost metric calculation.

15. The coding device of claim 11, wherein the coding circuitry is configured to determine a rate-distortion optimization cost function to perform the cost metric calculation.

16. The coding device of claim 11, wherein the selection circuitry is configured to select the bit depth based at least in part on an available resource for coding.

17. A method performed by a coding device, the method comprising:
receiving an input stream at a data interface on which a coding task is to be performed;
at selection circuitry in data communication with the data interface, determining a block size for a cost metric calculation to be performed on the input stream;
responsive to the determined block size, selecting a calculation domain for the cost metric calculation based at least in part on the determined block size; and
sending an indication of the calculation domain selection and the block size to coding circuitry to perform the cost metric calculation in the calculation domain based at least in part on the block size in support of executing the coding task.

18. The method of claim 17, wherein the selected calculation domain comprises a frequency domain or a spatial domain.

19. The method of claim 18, wherein selecting the calculation domain for the cost metric calculation based at least in part on the determined block size further comprises:
when the block size is above a threshold, selecting the frequency domain; and
when the block size is below the threshold, selecting the spatial domain.

20. The method of claim 17, wherein the cost metric calculation comprises a determination of a rate-distortion optimization cost function to be performed within the selected calculation domain.

* * * * *